(12) United States Patent
Yun et al.

(10) Patent No.: US 10,564,767 B2
(45) Date of Patent: Feb. 18, 2020

(54) DISPLAY DEVICE

(71) Applicant: Samsung Display Co., Ltd., Yongin-si, Gyeonggi-do (KR)

(72) Inventors: Jung Mi Yun, Yongin-si (KR); Ung Choi, Yongin-si (KR); Jeong Mo Nam, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 56 days.

(21) Appl. No.: 15/787,092

(22) Filed: Oct. 18, 2017

(65) Prior Publication Data

US 2018/0121013 A1 May 3, 2018

(30) Foreign Application Priority Data

Nov. 1, 2016 (KR) .......................... 10-2016-0144553

(51) Int. Cl.
*G06F 3/041* (2006.01)
*G02F 1/1333* (2006.01)
*G06F 3/044* (2006.01)

(52) U.S. Cl.
CPC ........ *G06F 3/0416* (2013.01); *G02F 1/13338* (2013.01); *G06F 3/044* (2013.01); *G06F 3/0412* (2013.01)

(58) Field of Classification Search
None
See application file for complete search history.

(56) References Cited

U.S. PATENT DOCUMENTS

| 7,561,216 | B2 | 7/2009 | Baier | |
|---|---|---|---|---|
| 9,177,904 | B2 | 11/2015 | Jung et al. | |
| 2011/0267307 | A1* | 11/2011 | Kim | G02F 1/13338 345/174 |
| 2014/0292713 | A1* | 10/2014 | Koito | G06F 3/0412 345/174 |

* cited by examiner

*Primary Examiner* — Kenneth B Lee, Jr.
(74) *Attorney, Agent, or Firm* — Cantor Colburn LLP (57) ABSTRACT

A display device includes: a display panel which displays an image with light; a touch sensing unit which senses a touch thereto, provided on the display panel; a control board which provides a control signal to control the display panel and the touch sensing unit, provided outside the display panel and the touch sensing unit, the control board including a first conductive layer and a second conductive layer which is on the first conductive layer; a first coupling member which electrically couples the display panel with the first conductive layer of the control board; and a second coupling member which electrically couples the touch sensing unit with the second conductive layer of the control board.

16 Claims, 4 Drawing Sheets

DISPLAY DEVICE

This application claims priority to Korean Patent Application no. 10-2016-0144553 filed on Nov. 1, 2016, and all the benefits accruing therefrom under 35 U.S.C. § 119, the content of which in its entirety is herein incorporated by reference.

BACKGROUND

(1) Field of Invention

Various embodiments of the present disclosure relate to a display device.

(2) Description of Related Art

A cathode ray tube has disadvantages of relatively large weight and volume. To mitigate the disadvantages of the cathode ray tube in a display device, various display devices which have reduced weight and volume have been developed. Representative examples of such display devices include a liquid crystal display ("LCD"), a field emission display ("FED"), a plasma display panel ("PDP"), and an organic light emitting display ("OLED").

Such display devices may include a display panel which includes a plurality of pixels to display an image, and a control board which is disposed outside the display panel, and on which a control circuit for controlling the display panel through a flexible printed circuit board ("FPCB") or the like is mounted.

SUMMARY

One embodiment of the present disclosure may provide a display device including: a display panel which displays an image with light; a touch sensing unit which senses a touch thereto, provided on the display panel; a control board which provides a control signal to control the display panel and the touch sensing unit, provided outside the display panel and the touch sensing unit, the control board including a first conductive layer and a second conductive layer which is on the first conductive layer; a first coupling member which electrically couples the display panel with the first conductive layer of the control board; and a second coupling member which electrically couples the touch sensing unit with the second conductive layer of the control board.

Either the first conductive layer or the second conductive layer may be disposed as an outer layer of the control board, and the other one of the first conductive layer and the second conductive layer may be disposed as an inner layer of the control board.

The second coupling member which electrically couples the touch sensing unit with the second conductive layer of the control board, may include a second conductive layer disposed between two protective layers, and the second conductive layer of the second coupling member may extend to the control board to define the second conductive layer of the control board.

The control board may be a rigid portion of a combination rigid-flexible printed circuit board ("PCB"), and the second coupling member may be a flexible portion of the combination rigid-flexible PCB.

The first coupling member may be a flexible printed circuit board.

The first and second conductive layers may be disposed as inner layers of the control board.

The control board may be a rigid portion of a combination rigid-flexible printed circuit board ("PCB"), and the first and second coupling members may be flexible portions of the combination rigid-flexible PCB.

The control board may include a bonding area at which the control board is coupled with either the first coupling member or the second coupling member, and a control circuit which provides the control signal, the control circuit disposed spaced apart from the bonding area of the control board.

In a plan view, the first coupling member and the second coupling member may overlap each other.

The display panel may include a first substrate on which pixels are provided to display the image with the light, and a second substrate facing the first substrate.

The display device may further include a display drive unit which provides a drive signal to the display panel, the display drive unit mounted on the first substrate or the first coupling member, and a touch drive unit which detects the touch to the touch sensing unit, the touch drive unit mounted on the second substrate or the second coupling member.

The touch sensing unit may be directly on the second substrate.

The touch sensing unit may include a first sensing electrode provided in plural arranged in a first direction; a first bridge pattern which couples adjacent first sensing electrodes to each other; a second sensing electrode provided in plural arranged in a second direction intersecting the first direction; and a second bridge pattern which couples adjacent second sensing electrodes to each other.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

DETAILED DESCRIPTION

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, components being related to each other such as "connected" or "coupled" refers to one component not only directly coupling another component but also indirectly coupling another component through an intermediate component. On the other hand, components being related to each other such as "directly connected" or "directly coupled" refers to one component directly coupling another component without an intermediate component. It will be understood that when an element is referred to as being related to another element such as being "between" two elements, it can be the only element between the two elements, or one or more intervening elements may also be present.

A display device may include a display panel which includes a plurality of pixels to display an image, and a control board which is disposed outside the display panel. A control circuit may be mounted on the control board, for controlling the display panel through a flexible printed circuit board ("FPCB") or the like.

The FPCB has a structure capable of being bonded to the control board. However, because heat and pressure are applied to the bonding region of the control board during bonding thereof to the FPCB, the control circuit may be undesirably damaged at the bonding region.

Figure 1A:
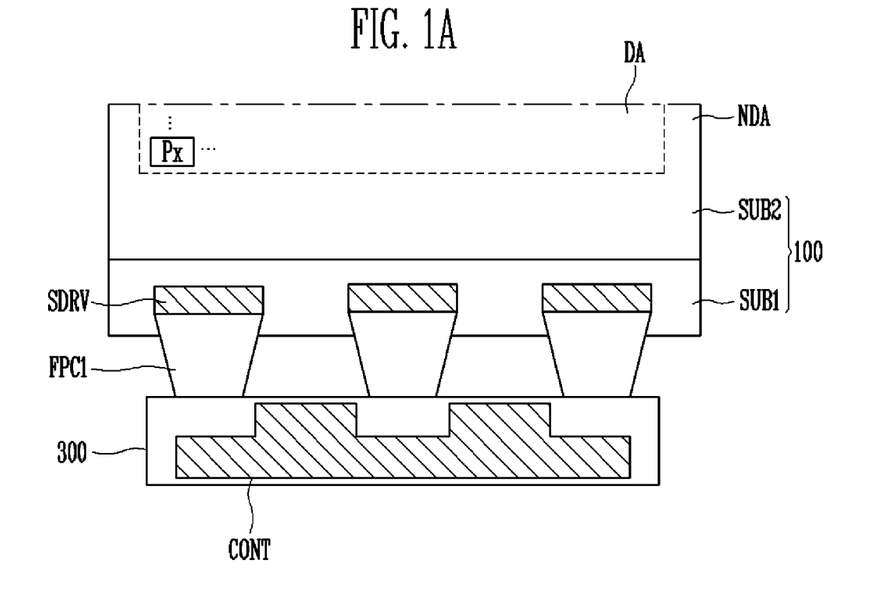
FIG. 1A is a top plan view schematically illustrating a portion of an exemplary embodiment of a display device according to the invention.
Figure 1B:
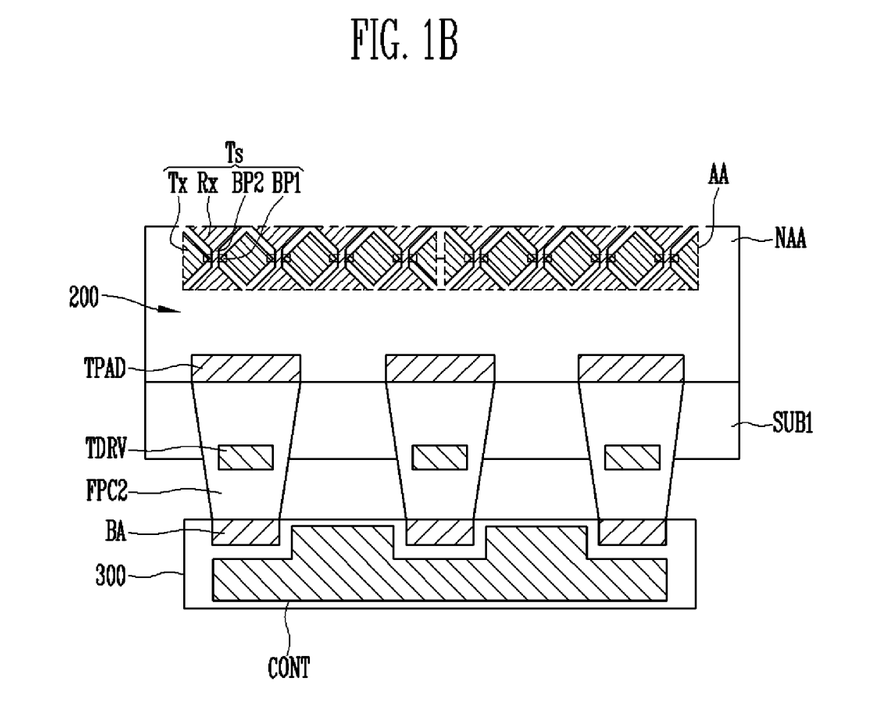
FIG. 1B is a top plan view schematically illustrating an exemplary embodiment of a touch sensing unit provided on the display panel of FIG. 1A.
Figure 2:
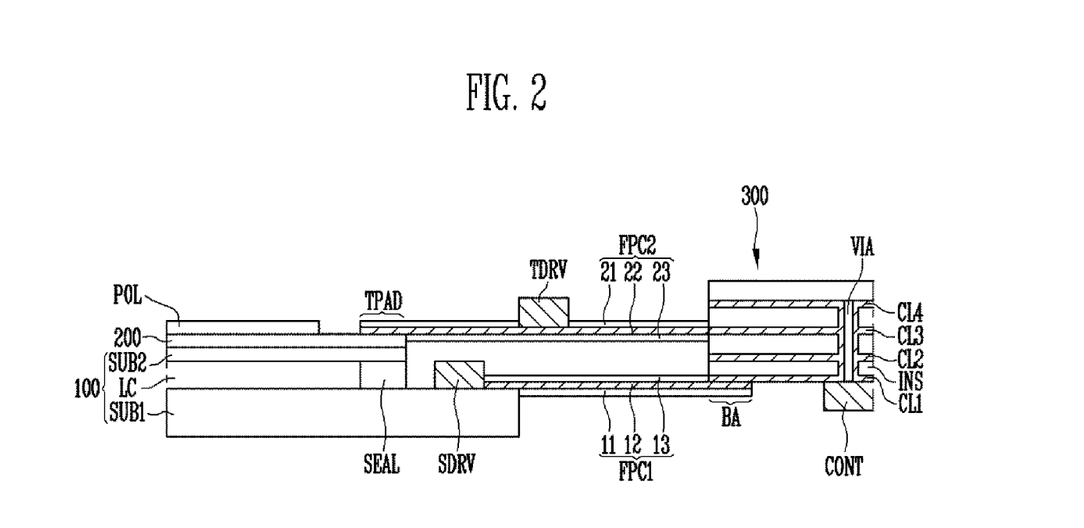
FIG. 2 is a partial cross-sectional view of the display device shown in FIGS. 1A and 1B.

FIG. 1A is a plan view schematically illustrating a portion of an exemplary embodiment of a display device according to the invention. FIG. 1B is a plan view schematically illustrating an exemplary embodiment of a touch sensing unit provided on the display panel of FIG. 1A. FIG. 2 is a partial cross-sectional view of the display device shown in FIGS. 1A and 1B. FIGS. 1A and 1B may be generally top plan views of opposing surfaces of the display device, but the invention is not limited thereto. FIGS. 1A and 1B are views of an end or edge portion of the display device, such as where the first substrate SUB1 is exposed by a smaller dimension second substrate SUB2.

Referring to FIGS. 1A, 1B and 2, a display device according to one or more embodiment of the present disclosure may include a display panel 100, a touch sensing unit 200, a control board 300, a first coupling member FPC1 and a second coupling member FPC2. The display device and components thereof may be disposed in a plane defined by first and second directions which cross each other, such as horizontal and vertical directions in FIGS. 1A and 1B or left-right in FIG. 2. A thickness of the display device and components thereof is taken in a third direction which crosses each of the first and second directions, such as into the view of FIGS. 1A and 1B and a vertical direction in FIG. 2.

The display panel 100 may include a first substrate SUB1 on which a pixel Px is provided in plurality, a second substrate SUB2 which faces the first substrate SUB1 in the thickness direction of the display panel 100, and an optical transmittance layer such as a liquid crystal layer LC which is interposed between the first substrate SUB1 and the second substrate SUB2. The display panel 100 may further includes a sealing member SEAL which seals the liquid crystal layer LC.

In an embodiment, the display panel 100 may be an organic light emitting display panel, but is not limited thereto. Various well-known examples may be applied to the display panel 100.

The first substrate SUB1 and the second substrate SUB2 may include or be made of insulating material such as glass or resin. Furthermore, the first substrate SUB1 and the second substrate SUB2 may include or be made of material having flexibility so as to be bendable or foldable, and have a single layer or multilayer structure.

In an embodiment, for example, the first substrate SUB1 and the second substrate SUB2 may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the first substrate SUB1 and the second substrate SUB2 may be changed in various ways, and the first substrate SUB1 and the second substrate SUB2 may also include or be made of fiber glass reinforced plastic ("FRP") or the like.

The display panel 100 includes a display area DA, and a non-display area NDA which is provided on at least one side of the display area DA.

The display area DA is an area which is provided with the pixels Px arranged in a matrix form, and at which an image is displayed. A display area of the display device may correspond to the display area DA of the display panel 100.

The pixels Px are provided in the display area DA. Each pixel Px refers to a smallest unit at which the image is displayed, and a plurality of pixels Px may be provided within the display area DA. The pixels Px may emit white light and/or color light to form and/or display the image. Each pixel Px may emit any one color of red, green and blue, but is not limited thereto, and the pixel Px may emit a color such as cyan, magenta or yellow.

Each of the pixels Px may be embodied in various forms such as an organic light emitting element, a liquid crystal element, an electrophoretic element or an electrowetting element.

The non-display area NDA may be an area in which the pixels Px are not provided so that an image is not displayed. The non-display area of the display device may correspond to the non-display area NDA of the display panel 100, and may further include remaining portions of the display device such as an end or edge portions thereof at which elements such as a coupling member, a control board, etc. are disposed.

The non-display area NDA may have a shape enclosing the display area DA. Although not shown in detail, signal lines (not shown) coupled with the respective pixels Px, and display drive units SDRV coupled with the corresponding signal lines and configured to drive the pixels Px, may be provided in the non-display area NDA. In an embodiment, for example, the signal lines may include various conductive signal lines a scan line, a data line, a drive voltage line and so forth, and further include other lines, as needed. Each of these conductive lines may be provided in plurality. The display drive unit SDRV may include a scan driver (not shown) which provides a scan signal to each pixel Px along the corresponding scan line, and a data driver (not shown) which provides a data signal to each pixel Px along the corresponding data line.

According to an embodiment of the present disclosure, in the case where the display drive unit SDRV is disposed or formed on a separate chip and the separate chip having the display drive unit SDRV thereon is coupled to the first substrate SUB1, the display drive unit SDRV may be provided in a chip-on-glass or chip-on-plastic form. Alternatively, the display drive unit SDRV may be mounted on the first coupling member FPC1 and the first coupling member FPC1 having the display drive unit SDRV thereon is coupled to the first substrate SUB1.

The touch sensing unit 200 is provided on the display panel 100. The touch sensing unit 200 may be disposed on the display side of the display device.

As shown in FIG. 1B, the touch sensing unit 200 may be divided into an active area AA at which touch input is sensable and a non-active area NAA which is disposed around the perimeter of the active area AA and at which a touch input is not sensable. The active area AA is overlapped with the display area DA, and the non-active area NAA is overlapped with the non-display area NDA.

The touch sensing unit 200 may include a touch sensor Ts provided in plural at the active area AA to sense the position of a touch input, perimeter lines (not shown) which are disposed in the non-active area NAA and are electrically coupled with the touch sensors Ts, and a touch pad unit TPAD which couples the perimeter lines to the second coupling member FPC2.

In an embodiment, the touch sensors Ts and the perimeter lines may be directly disposed or formed on the second substrate SUB2 of the display panel 100. Alternatively, the touch sensors Ts and the perimeter lines may be separate elements which are adhered to the display panel 100 in a manner using a separate panel or film. As a further alternative, the touch sensors Ts and the perimeter lines may be provided in the display panel 100 in an in-cell manner.

The touch sensors Ts may include a first sensing electrode Tx which is provided in plural arranged in a row direction, a first bridge pattern BP1 which is provided in plural coupled to first sensing electrodes Tx disposed adjacent to each other, a second sensing electrode Rx which is provided in plural arranged in a column direction, and a second bridge pattern BP2 which is provided in plural coupled to second sensing electrodes Rx disposed adjacent to each other.

The first sensing electrodes Tx and the second sensing electrodes Rx may be a plurality of conductive patterns for sensing the touch input, and may be uniformly distributed on the active area AA. Mutual capacitance is formed between the first sensing electrodes Tx and the second sensing electrodes Rx. The mutual capacitance is changed when a touch event is generated. In an embodiment, the touch sensors Ts may be configured of self-capacitance sensing electrodes.

The first sensing electrodes Tx and the second sensing electrodes Rx may be disposed or formed in a same layer or different layers among layers on a substrate of the display panel 100, such as the second substrate SUB2. Each of the first sensing electrodes Tx and the second sensing electrodes Rx may have a single-layer or multilayer structure. Furthermore, each of the first sensing electrodes Tx and the second sensing electrodes Rx may be provided in various planar shapes, e.g., a bar shape, a polygonal shape including a rhombus shape or a circular shape.

Each of the first sensing electrodes Tx and the second sensing electrodes Rx may include or be made of transparent electrode material to allow light to pass therethrough. In an embodiment, for example, each of the first sensing electrodes Tx and the second sensing electrodes Rx may include or be made of transparent conductive material such as indium tin oxide ("ITO"), indium zinc oxide ("IZO" or antimony zinc oxide ("AZO").

In an embodiment, the first bridge patterns BP1 have patterns separate from the corresponding first sensing electrodes Tx. That is, the first bridge patterns BP1 may not be integrally formed with the corresponding first sensing electrodes Tx. Each first bridge pattern BP1 may be disposed above or under the corresponding first sensing electrodes Tx, such as in different layers, and electrically coupled to the first sensing electrodes Tx. The first bridge patterns BP1 may couple the first sensing electrodes Tx adjacent to each other on a line (shape or direction) basis. The second bridge patterns BP2 may be integrally formed with the corresponding second sensing electrodes Rx to be disposed in a same layer thereas. That is, one of the second bridge patterns BP2 and the second sensing electrodes RX may extend to form the other one of the second bridge patterns BP2 and the second sensing electrodes RX.

The first bridge patterns BP1 may include or be made of the same transparent electrode material as that of the first sensing electrodes Tx, or include or be made of an opaque relatively low-resistance metal. Dimensions such as the width, the thickness, the length, etc. of the first bridge patterns BP1 may be adjusted to reduce or effectively prevent the first bridge patterns BP1 from being visible. In the case where the first bridge patterns BP1 include or are made of the opaque relatively low-resistance metal, during an operation of forming the perimeter lines in an embodiment of manufacturing a display device, the first bridge patterns BP1 are formed along with the perimeter lines. Consequently, the manufacturing process may be simplified. In other words, the first bridge patterns BP1 may include or be formed of the same material as that of the perimeter lines in the same layer thereof, may be formed from a same material layer as that of the perimeter lines and/or may be formed in a same manufacturing process as that of the perimeter lines.

The second bridge patterns BP2 may include or be made of transparent electrode material in the same manner as that of the second sensing electrodes Rx. In the case where the second bridge patterns BP2 include or are made of the transparent electrode material, the second sensing electrodes Rx and the second bridge patterns BP2 may be integrally formed during an operation of patterning a transparent electrode material layer in an embodiment of manufacturing a display device, whereby the manufacturing process may be simplified. In other words, the second bridge patterns BP2 may include or be formed of the same material as that of the second sensing electrodes Rx in the same layer thereof, may be formed from a same material layer as that of the second sensing electrodes Rx and/or may be formed in a same manufacturing process as that of the second sensing electrodes Rx.

To prevent the first bridge patterns BP1 from coming into contact with the second bridge patterns BP2, an insulating layer (not shown) may be disposed or formed between the first bridge patterns BP1 and the second bridge patterns BP2, such as in the thickness direction of the display device. In an embodiment, for example, the insulating layer may be partially formed at the junction between each first bridge pattern BP1 and a corresponding second bridge pattern BP2.

In the embodiment of the present disclosure, although there is illustrated an example in which each of the first and second sensing electrodes Tx and Rx have a planar diamond shape in the top plan view, the present disclosure is not limited thereto. In other words, the planar shapes, the structures, or the materials of various well-known conductive patterns may be selected as those of the first and second sensing electrodes Tx and Rx.

In an embodiment, for example, the first sensing electrodes Tx and the second sensing electrodes Rx may be provided in a mesh shape in the top plan view, having a structure in which a plurality of conductive lines lengthwise extend in different directions to intersect each other. The first sensing electrodes Tx and the second sensing electrodes Rx may include or be made of conductive metal, or a conductive nano-compound such as a silver nanowire (AgNW), a carbon nanotube or graphene.

The perimeter lines are coupled with the first sensing electrodes Tx and the second sensing electrodes Rx on a line basis, and are electrically coupled to a touch drive unit TDRV through the touch pad unit TPAD, to connect the first and second sensing electrodes Tx and Rx to the touch pad unit TPAD. The touch pad unit TPAD may be provided at a predetermined position in the non-active area NAA. The touch drive unit TDRV may be mounted on the second coupling member FPC2.

A polarizing plate POL may be provided on the touch sensing unit 200. The polarizing plate POL may be disposed on the display side of the display device.

The control board 300 may be provided outside the display panel 100 and the touch sensing unit 200. The control board 300 may provide a control signal, such as a power (voltage) signal, to the display panel 100 and the touch sensing unit 200. The control board 300 may include a plurality of conductive layers CL1, CL2, CL3 and CL4 which are successively stacked, and a plurality insulating layers INS which are respectively disposed between conductive layers CL1, CL2, CL3 and CL4 adjacent to each other along the thickness direction. The control board 300 may include a via hole VIA at which the conductive layers CL1, CL2, CL3 and CL4 are electrically coupled to each other.

In the embodiment, although it has been shown that the control board 300 has four conductive layers CL1, CL2, CL3 and CL4, the present disclosure is not limited thereto. The control board 300 may have a structure in which various numbers of conductive layers are stacked.

In an embodiment, among the conductive layers CL1, CL2, CL3 and CL4, the first conductive layer CL1 is disposed at an outer layer which is provided at the outermost position of the control board 300 and partially or entirely exposed to outside the control board 300 and/or the display device. In FIG. 2, where only a portion of the control board 300 is shown (control board 300 continues to the right past the dotted line at the right side of the view), the first conductive layer CL1 is extended from an inner area (right side, dotted line boundary) of the control board 300, further than the control circuit CONT and toward the display panel 100, to be exposed outside the control board 300.

Each of the second to fourth conductive layers CL2 to CL4 is disposed as an inner layer of the control board 300 which is provided between other component layers of the control board 300 and not exposed to outside the control board 300 and/or the display device. In FIG. 2, where only a portion of the control board 300 is shown (control board 300 continues to the right past the dotted line at the right side of the view), the second to fourth conductive layers CL2 to CL4 are each extended from an inner area (right side, dotted line boundary) of the control board 300, further than the control circuit CONT and toward the display panel 100, to not be exposed outside the control board 300.

In an alternative embodiment, the first conductive layer CL1 may be disposed as the inner layer, and the second conductive layer CL2 may be disposed as the outer layer.

Various lines and circuit patterns may be formed in or by the conductive layers CL1, CL2, CL3 and CL4. Each of the conductive layers CL1, CL2, CL3 and CL4 may include or be made of metal. In an embodiment, for example, each of the conductive layers CL1, CL2, CL3 and CL4 may include or be made of at least one of metals such as gold (Au), silver (Ag), aluminum (Al), molybdenum (Mo), chrome (Cr), titanium (Ti), nickel (Ni), neodymium (Nd), copper (Cu), or an alloy of the metals. Each of the conductive layers CL1 to CL4 may have a single layer structure, but is not limited thereto, and may have a multilayer structure formed by stacking two or more material layers of metals and alloys thereof.

Each of the insulating layers INS may be an organic insulating layer or an inorganic insulating layer. Organic insulating material such as a polyacryl-based compound, a polyimide-based compound, a fluorocarbon compound such as Teflon®, or a benzocyclobutene compound may be used as material of the organic insulating layer. Inorganic insulating material such as polysiloxane, silicon nitride or silicon oxide may be used as material of the inorganic insulating layer.

The control board 300 may include a bonding area BA at which the control board 300 is coupled to the first coupling member FPC1, and a control circuit CONT which is disposed to avoid the bonding area BA and configured to control the display panel 100 and the touch sensing unit 200. The bonding area BA may include an area of the control board 300 except for that corresponding to the control circuit CONT. The control circuit CONT is spaced apart from the bonding area BA. In an embodiment of manufacturing a display device, since heat and pressure are applied to the bonding area BA of the control board 300 when the control board 300 is bonded to the first coupling member FPC1, the control circuit CONT is disposed to avoid the bonding area BA such as by being disposed separated therefrom. The control circuit CONT may include a power supply unit which supplies power, a timing control unit, and so forth. The control circuit CONT may generate and/or provide a control signal, such as the power (voltage) signal, etc. to the display panel 100 and the touch sensing unit 200.

The first coupling member FPC1 electrically couples the display panel 100 with the first conductive layer CL1 of the control board 300. The first coupling member FPC1 may include a first conductive member (layer) 12 disposed between two protective layers 11 and 13. The first conductive member 12 is coupled with the first conductive layer CL1. The two protective layers 11 and 13 may include an insulating material. The first conductive member 12 may include a conductive material such as metal.

In an embodiment, the first coupling member FPC1 may be a flexible printed circuit board. A first end of the first coupling member FPC1 may be attached to the first substrate SUB1 of the display panel 100 such as in a film-on-glass ("FOG") manner. In an embodiment, for example, the first coupling member FPC1 and the display panel 100 may be electrically coupled to each other by an anisotropic conductive film ("ACF"). A second end of the first coupling member FPC1 which is opposite to the first end thereof may be bonded to the bonding area BA of the control board 300.

The second coupling member FPC2 electrically couples the touch sensing unit 200 with the third conductive layer CL3 of the control board 300. The second coupling member FPC2 may include a second conductive member 22 disposed between two protective layers 21 and 23. The second conductive member 22 is coupled with the third conductive layer CL3. The two protective layers 21 and 23 may include an insulating material. The second conductive member 22 may include a conductive material such as metal.

In an embodiment, a first end of the second coupling member FPC2 is attached to the touch pad unit TPAD of the touch sensing unit 200. In an embodiment, for example, the second coupling member FPC2 and the touch sensing unit 200 may be electrically coupled to each other by an anisotropic conductive film. A second end of the second coupling member FPC2 opposite to the first end thereof may be electrically coupled with the third conductive layer CL3 of the control board 300.

In an embodiment, the touch drive unit TDRV for driving the touch sensing unit 200 may be mounted on the second coupling member FPC2. The touch drive unit TDRV may sense a change in capacitance between the touch sensors Ts, thereby detecting the position of a touch from the touch input. In an embodiment, for example, the touch drive unit TDRV may be mounted on the second coupling member FPC2 in a chip on film ("COF") form.

In an embodiment, in a top plan view, the first coupling member FPC1 and the second coupling member FPC2 may overlap each other. Each of the first and second coupling members FPC1 and FPC2 may have a trapezoidal planar shape. However, the present disclosure is not limited thereto.

In an embodiment, the second coupling member FPC2 may be integrally formed with the third conductive layer CL3. That is, one of a conductive layer of the control board 300 and a layer of the second coupling member FPC2 may extend therefrom to define the other one of a conductive layer of the control board 300 and a layer of the second coupling member FPC2. In this case, the control board 300 may be a relatively rigid part of an overall combination rigid-flexible (e.g., rigid-flex) printed circuit board ("PCB"), and the second coupling member FPC2 may be a relatively flexible part of the rigid flex PCB. The rigid part and the flexible part may be integrally formed during an operation of manufacturing the rigid-flex PCB. In detail, during an operation of forming the third conductive layer CL3 of the control board 300 in an embodiment of manufacturing a display device, the second conductive member 22 of the second coupling member FPC2 may be formed along with the third conductive layer CL3. That is, the third conductive layer CL3 and the second conductive member 22 may be a same conductive material layer extended to define portions of both of the control board 300 and the second coupling member FPC2.

In one or more embodiment according to the invention, since the control circuit CONT is disposed at a region other than the bonding area BA, heat and pressure applied to the bonding area BA of the control board 300 during bonding thereof to the FPCB, does not damage the control circuit CONT.

FIGS. 3A to 3D are partial cross-sectional views of other exemplary embodiments of a display device according to the invention.

Hereinbelow, the configuration of the display device according to the other exemplary embodiments may be substantially the same as that described above; therefore, any repetitive detailed explanation will be omitted.

Figure 3A:
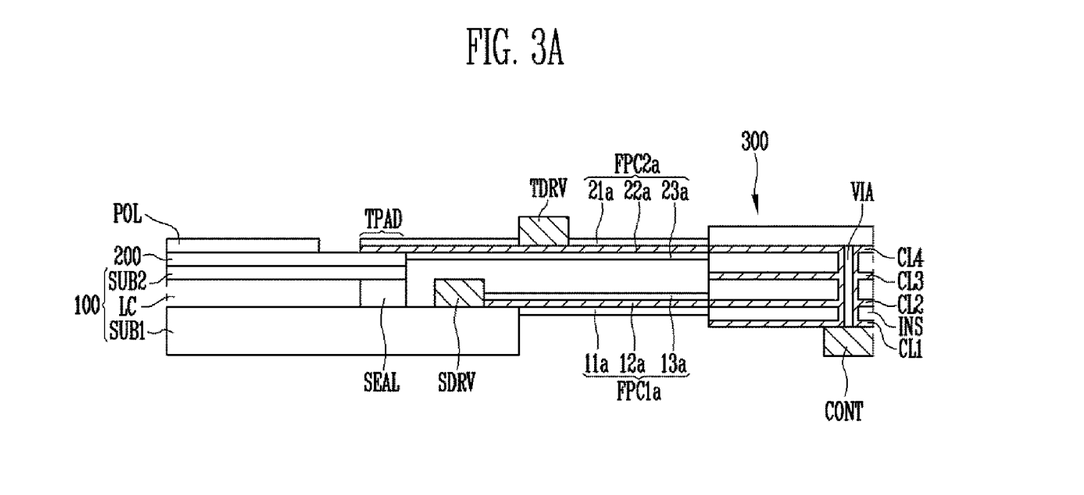
FIGS. 3A to 3D are partial cross-sectional views of other exemplary embodiments of a display device according to the invention.

Referring to FIG. 3A, in the display device according to another exemplary embodiment of the present disclosure, a first coupling member FPC1a of the display device may be coupled with the second conductive layer CL2 of the control board 300, and the second coupling member FPC2a thereof may be coupled with the fourth conductive layer CL4 of the control board 300. The second conductive layer CL2 and the fourth conductive layer CL4 are disposed as inner layers of the control board 300. The first and second coupling members FPC1a and FPBC2a may respectively include a first conductive member (layer) 12a and 22a, disposed between two protective layers 11a and 13a and 21a and 23a.

In an embodiment, the first coupling member FPC1a may be integrally formed with the second conductive layer CL2, and the second coupling member FPC2a may be integrally formed with the fourth conductive layer CL4. In this case, the control board 300 may be a rigid part of an overall combination rigid-flex PCB, and the first coupling member FPC1a and the second coupling member FPC2a may be a flexible part of the overall rigid-flex PCB. During an operation of forming the second conductive layer CL2 of the control board 300 in an embodiment of manufacturing a display device, the first conductive member 12a of the first coupling member FPC1a may be formed along with the second conductive layer CL2. During an operation of forming the fourth conductive layer CL4 of the control board 300, a second conductive member 22a of the second coupling member FPC2a may be formed along with the fourth conductive layer CL4. That is, the second and fourth conductive layers CL2 and CL4, and the first conductive member 12a and the second conductive member 22a, may respectively be a same conductive material layer extended to define portions of each of the control board 300, the first coupling member FPC1*a* and the second coupling member FPC2*a*.

Figure 3B:
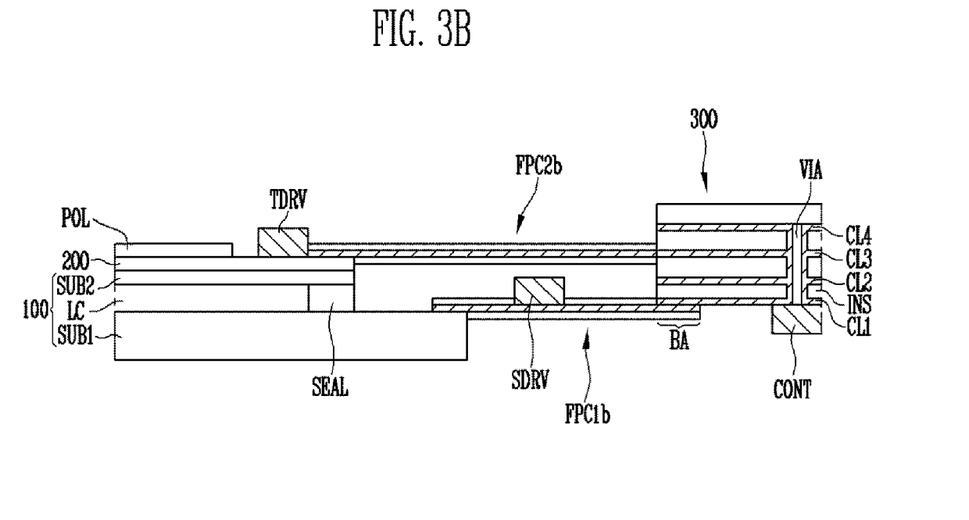

Referring to FIG. 3B, in the display device according to still another exemplary embodiment, the display drive unit SDRV may be mounted on a first coupling member FPC1*b* in a chip on film ("COF") form. The touch drive unit TDRV may be mounted on the second substrate SUB2 of the display panel 100. In this case, an end of a second coupling member FPC2*b* may be attached to the second substrate SUB2 in a film-on-glass ("FOG") manner.

Figure 3C:
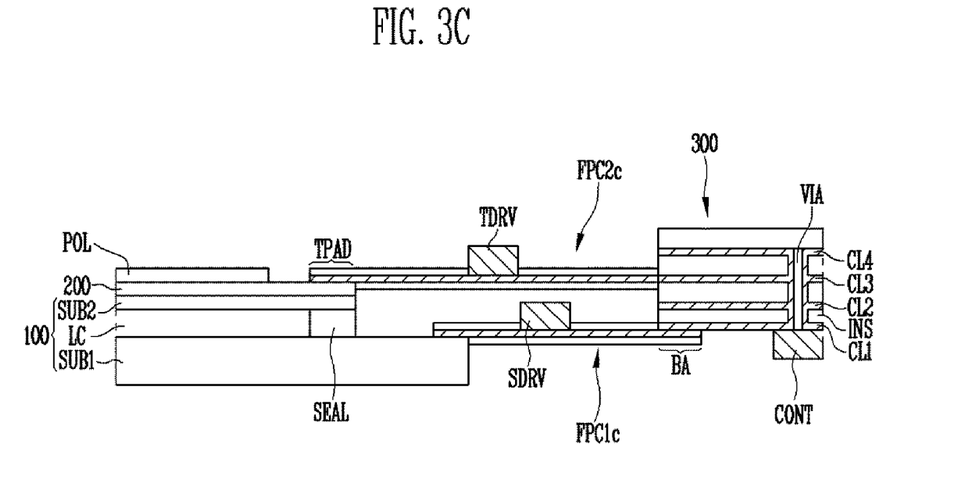

Referring to FIG. 3C, in the display device according to yet another exemplary embodiment, the display drive unit SDRV may be mounted on a first coupling member FPC1*c* in a chip on film ("COF") form. The touch drive unit TDRV may be mounted on a second coupling member FPC2*c* in a chip on film ("COF") form. In this case, an end of the second coupling member FPC2*c* is attached to the touch pad unit TPAD of the touch sensing unit 200. In an embodiment, for example, the second coupling member FPC2*c* and the touch sensing unit 200 may be electrically coupled to each other by the anisotropic conductive film.

Figure 3D:
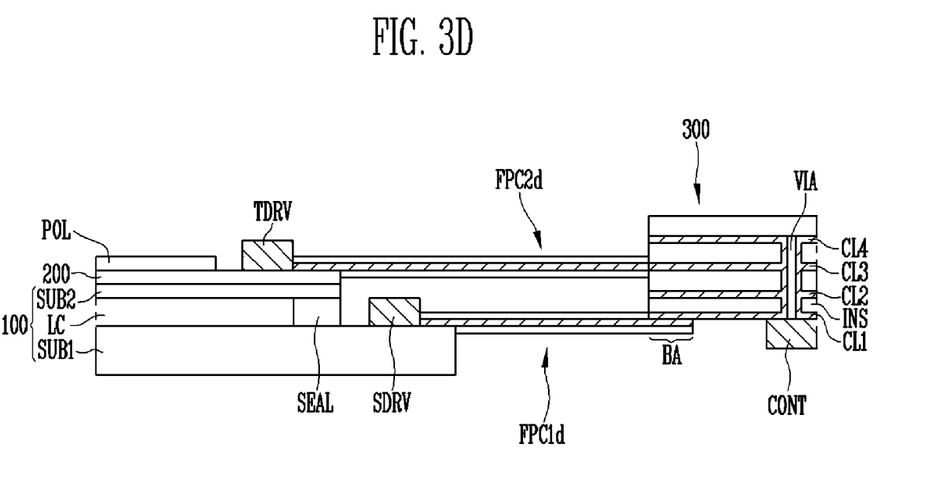

Referring to FIG. 3D, in the display device according to yet another exemplary embodiment, the display drive unit SDRV may be mounted on the first substrate SUB1 of the display panel 100. In this case, an end of a first coupling member FPC1*d* may be attached to the first substrate SUB1 in a film-on-glass ("FOG") manner. The touch drive unit TDRV may be mounted on the second substrate SUB2 of the display panel 100. In this case, an end of a second coupling member FPC2*d* may be attached to the second substrate SUB2 in a film-on-glass ("FOG") manner.

As described above, according to one or more exemplary embodiment of the present disclosure, a first conductive layer of a control board may be coupled with a display panel through a first coupling member, and a second conductive layer of the control board may be coupled with a touch sensing unit through a second coupling member. Consequently, an overall size of the control board may be reduced, whereby the area efficiency occupied by the control board within the display device may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a display panel;
a touch sensing unit provided on the display panel;
a control board which provides control signals to both the display panel and the touch sensing unit, the control board including: a first conductive layer and a second conductive layer which is on the first conductive layer;
a first circuit board which electrically couples the display panel with the first conductive layer of the control board; and a second circuit board which electrically couples the touch sensing unit with the second conductive layer of the control board, the second circuit board comprising a second conductive member,
wherein the second conductive member of the second circuit board and the second conductive layer of the control board are portions of a same conductive material layer.

2. The display device of claim 1, wherein
one of the first conductive layer and the second conductive layer is an outer layer of the control board, the outer layer exposed outside the control board, and
the other one of the first conductive layer and the second conductive layer is an inner layer of the control board, the inner layer not exposed outside the control board.

3. The display device of claim 2, wherein the second circuit board further comprises the second conductive member disposed between two protective layers.

4. The display device of claim 1, wherein
the first circuit board which electrically couples the display panel with the first conductive layer of the control board, comprises a first conductive member, and
the first conductive member of the first circuit board the first conductive layer of the control board are portions of a same conductive material layer.

5. The display device of claim 1, wherein
the control board is a rigid portion of a combination rigid-flexible printed circuit board, and
the second circuit board which electrically couples the touch sensing unit with the second conductive layer of the control board is a flexible portion of the combination rigid-flexible printed circuit board.

6. The display device of claim 1, wherein the first circuit board is a flexible printed circuit board.

7. The display device of claim 1, wherein the first and second conductive layers of the control board are respectively inner layers of the control board, the inner layers not exposed outside the control board.

8. The display device of claim 7, wherein
the control board is a rigid portion of a combination rigid-flexible printed circuit board, and
the first and second circuit boards are respectively flexible portions of the combination rigid-flexible printed circuit board.

9. The display device of claim 1, wherein the control board comprises:
a bonding area at which the control board is coupled with the first circuit board or the second circuit board, and
a control circuit which provides a control signal, the control circuit disposed spaced apart from the bonding area of the control board.

10. The display device of claim 1, wherein, in a plan view, the first circuit board and the second circuit board overlap each other.

11. The display device of claim 1, wherein the display panel comprises:
a first substrate on which pixels are provided to display an image with light, and
a second substrate facing the first substrate.

12. The display device of claim 11, further comprising:
a display drive unit which provides a drive signal to the display panel, the display drive unit mounted on the first substrate of the display panel or the first circuit board, and a touch drive unit which detects a touch to the touch sensing unit, the touch drive unit mounted on the second substrate of the display panel or the second circuit board.

13. The display device of claim 11, wherein the touch sensing unit is directly on the second substrate of the display panel.

14. The display device of claim 1, wherein the touch sensing unit provided on the display panel comprises:
- a first sensing electrode provided in plural arranged in a first direction;
- a first bridge pattern which couples adjacent first sensing electrodes to each other;
- a second sensing electrode provided in plural arranged in a second direction which intersects the first direction; and
- a second bridge pattern which couples adjacent second sensing electrodes to each other.

15. A method of manufacturing a display device, the method comprising:
- providing a display panel;
- providing a touch sensing unit, on the display panel;
- providing a control board which provides a control signal to the display panel and the touch sensing unit, outside the display panel and the touch sensing unit, the control board comprising: a first conductive layer and a second conductive layer which is on the first conductive layer;
- electrically coupling the display panel with the first conductive layer of the control board, through a first coupling member; and
- electrically coupling the touch sensing unit with the second conductive layer of the control board, through a second coupling member, wherein the control board further comprises:
- a control circuit which provides a control signal, and
- a bonding area at which the control board is coupled with the first coupling member, the bonding area excluding an area of the control board at which the control circuit is provided, and the electrically coupling the display panel with the first conductive layer of the control board comprises coupling the first conductive layer at the bonding area with the first coupling member.

16. The method of claim 15, wherein the second coupling member includes a second conductive member, the second conductive layer extending to the control board to define the second conductive layer of the control board.

* * * * *